(12) United States Patent
Huang

(10) Patent No.: US 7,774,266 B1
(45) Date of Patent: Aug. 10, 2010

(54) BOND OPTION MODELING

(75) Inventor: Jian Huang, New York, NY (US)

(73) Assignee: Morgan Stanley, New York, NY (US)

( * ) Notice: Subject to any disclaimer, the term of this patent is extended or adjusted under 35 U.S.C. 154(b) by 351 days.

(21) Appl. No.: 11/983,156

(22) Filed: Nov. 7, 2007

(51) Int. Cl.
*G06Q 40/00* (2006.01)

(52) U.S. Cl. .......................... 705/37; 705/35; 705/36 R

(58) Field of Classification Search ................... 705/35, 705/36 R, 37
See application file for complete search history.

(56) References Cited

U.S. PATENT DOCUMENTS 7,171,385 B1 * 1/2007 Dembo et al. ............. 705/36 R
7,236,952 B1 * 6/2007 D'Zmura ................. 705/36 R

OTHER PUBLICATIONS

Steven L Heston. (1993). A Closed-Form Solution for Options with Stochastic Volatility with Applications to Bond and Currency Options. The Review of Financial Studies (1986-1998), 6(2), 327. Retrieved Jun. 3, 2010, from ABI/INFORM Global. (Document ID: 618343711).*
Ken He. (2007). Real Options Application in Project Evaluation Practice. Cost Engineering, 49(8), 16-19. Retrieved Jun. 3, 2010, from ABI/INFORM Global. (Document ID: 1331814471).*
S Olafsson. (2003). Making Decisions Under Uncertainty—Implications for High Technology Investments. BT Technology Journal, 21(2), 170-183. Retrieved Jun. 3, 2010, from ABI/INFORM Global. (Document ID: 440132161).*
Annaert, Jan et al., "Risk Management of a Bond Portfolio Using Options," May 2007, pp. 1-24.
"Entropy Options Models," Nov. 2003, pp. 1-17.
Gulko, Les, "Empirical Tests of the Beta Model for Bond Option Pricing," Aug. 2002, pp. 1-25.
Hagan, Patrick S. et al., "Managing Smile Risk," Wilmott Magazine, Jul. 26, 2002, pp. 84-108.
Henrard, Marc, "Explicit Bond Option and Swaption Formula in Heath-Jarrow-Morton One Factor Model," Jan. 25, 2003, pp. 1-12.

(Continued)

*Primary Examiner*—Hani Kazimi
*Assistant Examiner*—Muriel Tinkler
(74) *Attorney, Agent, or Firm*—K&L Gates LLP

(57) ABSTRACT

Systems and methods for determining a present value of an option on a security having a fixed cash flow leg based upon a Martingale. The Martingale may be based upon a ratio of the present value of the option and a numeraire. The numeraire may be a coupon annuity which may be based on coupons of the security post expiry of the option, accrual periods of the coupon, and spread-adjusted discount factors for coupon dates of the option. The spread-adjusted discount factor may be based on an instantaneous forward rate and a time-varying spread. The present value of the option may be determined based upon a spread, a notional value of the security, and an expectation of a maximum value of (1) a difference between an artificial strike coupon and a forward swap rate and (2) zero. This spread may equal a difference between the forward swap rate and a strike coupon or the strike coupon divided by the forward swap rate.

36 Claims, 4 Drawing Sheets

OTHER PUBLICATIONS

Henrard, Marc, "Bonds Futures and Their Options: More Than the Cheapest-to-Deliver; Quality Option and Marginning," Munich Personal RePEc Archive, May 2006, pp. 1-15.

Ho, T.S. et al., "The Valuation of American Options on Bonds," Apr. 16, 1997, pp. 1-34.

Hull, John C., *Options, Futures, and Other Derivatives*, Sixth Edition, Prentice Hall, Upper Saddle River, U.S.A., 2005, Chapters 25, 26 and 28, pp. 589-633; 649-677.

Joslin, Scott, "Pricing and Hedging Volatility Risk in Fixed Income Markets," Sep. 30, 2007, pp. 1-47.

Phillips, Peter C. B. and Jun Yu, "Jackknifing Bond Option Prices," Mar. 2003, pp. 1-50.

Wei, Jason Z., "A Simple Approach to Bond Option Pricing," The Journal of Futures Markets, vol. 17, No. 2, 1997, pp. 131-160.

\* cited by examiner

BOND OPTION MODELING

BACKGROUND

A bond option gives the holder of the option the right to purchase or sell a particular bond at a specified price by a specified date. Many bond options trade in the over-the-counter market. In addition, bond options are often embedded in bonds when those bonds are issued. This feature may make the bonds more attractive to potential investors. Embedded bond options may be callable or puttable. A callable bond option gives the issuer the right to repurchase the bond at a predetermined price at certain specified times. Often callable bond options cannot be "called" during a lock out period which normally occurs over the first few years of the bond option. A puttable bond option gives the holder of the option the right to demand early redemption at a predetermined price at certain specified times. Both over-the-counter bond options and embedded bond options may be European bond options. A European bond option is an option to buy or sell a bond at a certain specified date for a predetermined price only at the maturity of the option.

Bond option pricing is an actively researched topic. Firms that hold or trade in such bond options have continually attempted to develop new models to price bond options. There are different approaches to modeling bond option pricing. Traditional efforts have been following the method of: (1) modeling short rate or forward rate first; (2) calculating the bond price; and (3) finally calculating the bond option price. Such models are well documented in standard mathematical finance texts. Another known approach is to price bond options by simulating bond yield as a diffusion process over a tree structure.

SUMMARY OF THE INVENTION

In one general aspect, the present invention is directed to systems and methods for determining a present value of an option on a security having a fixed cash flow leg. According to various embodiments, the present value of the option is calculated based on a Martingale for the ratio of the present value of the option to a numeraire, where the numeraire is based on the value of all bond coupons due after option expiry, taking into consideration the coupon annuity which may be based on factors including: accrual periods of the coupons and the spread-adjusted discount factors for coupon dates of the option. According to various embodiments, the bond option present value may be completed using conventional swaption stochastic pricing models.

BRIEF DESCRIPTION OF THE FIGURES

Embodiments of the present invention are described herein by way of example in conjunction with the following figures, wherein:

FIG. 3 is a flowchart illustrating steps taken to determine a present value of an option according to another embodiment of the present invention; and.

DETAILED DESCRIPTION OF THE INVENTION

According to various embodiments, the present invention is directed to systems and methods for pricing options on securities, such as bonds, notes, mortgage backed securities, or any other security having a fixed cash flow leg. The present invention is described herein below as being used to price bond options, although it should be recognized that it could be used for other types of instruments, as noted above.

Figure 1:
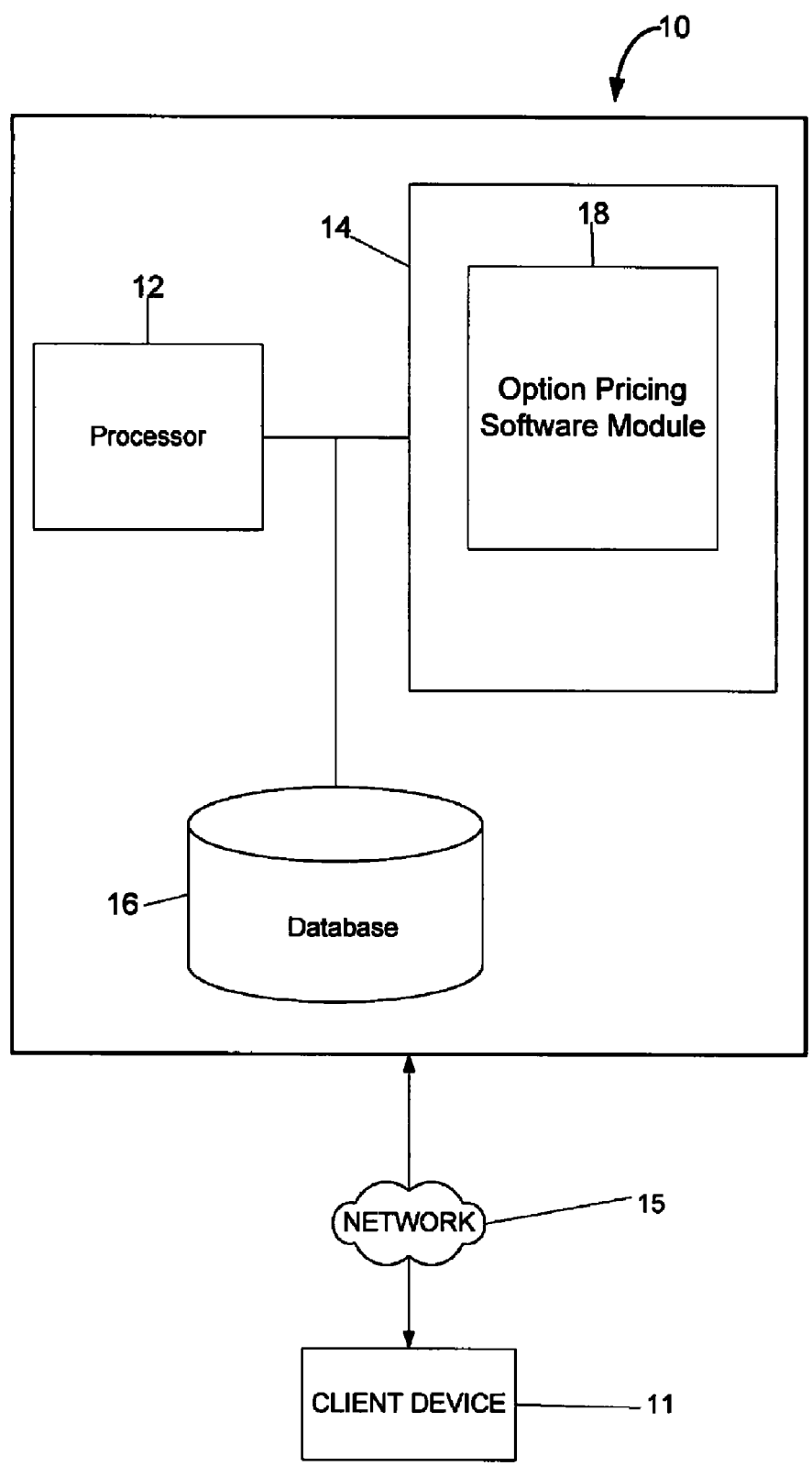
FIG. 1 depicts a computer system according to one embodiment of the present invention.

As shown in FIG. 1, one embodiment of the present invention may comprise a computer system 10 that calculates the present value (or price) of such an option. The computer system may comprise one or more processors 12 in communication with a memory 14 and a database 16. The database 16 may store financial data for the option to be priced that may be transmitted or downloaded to the computer system 10. The stored financial data may include: the term of the securities; the coupon rate; the issuer; the notional value of the security; coupon accrual periods; payment dates; currency; the option expiry date; the option settle date; exercise fees; accrued interests; the option type (e.g., call or put); the option position (e.g., long or short); the strike price; the bond spot price; the bond forward price on the option settle date; etc. The memory 14 may comprise an option pricing software module 18. When the processor 12 executes the code of the option pricing software module 18, the processor 12 may be caused to calculate the present value or price of an option. The calculated values may be stored in the database 18, the memory 14, or any other data store associated with the computer system 10.

The computer system 10 may comprise one or a number of networked computer devices, such as personal computers, laptops, mainframe computers, servers, workstations, or any other suitable computing devices. The memory 14 may be any suitable type of computer-readable medium, such as, for example, random access memory (RAM), read-only memory (ROM), a magnetic medium, such as a hard drive or floppy disk, or an optical medium, such as a CD-ROM. The option pricing software module 18 may be implemented as software code to be executed by the processor(s) 12 using any suitable computer language. The software code may be stored as a series of instructions or commands in the memory 14.

According to various embodiments, the option pricing method used by the system 10 may be similar in spirit to swaption pricing. Well calibrated and trusted swaption pricing models are known (see Managing Smile Risk, Patrick S. Hagan, et al., p. 84-108, Wilmott Magazine, Jul. 26, 2002), but they are not used to price bond options. The inventor has discovered that there are at least two advantages to relating bond option pricing to swaption pricing. First, a bond may have cashflows that are identical to those of a fixed leg of a swap. For example, a call/put option on a bond may be similar to a receiver/payer swaption. Also, bond pricing may utilize spread quotes from asset swaps. Second, the bond yield volatility grid used in other models may be obtained by importing the volatility grid of swaptions with a constant multiplier. However, due to limited liquidity in the market, bonds are not directly priced off yield curves. Accordingly, a spot spread-adjusted discount factor, as described further below, may be used to relate bond prices to discount factors implied by a yield curve. According to various embodiments, the spread can vary over time, but at a specific time, the spread may be constant across all points on the yield curve (i.e., a time-dependent, yet uniform spread).

Figure 2:
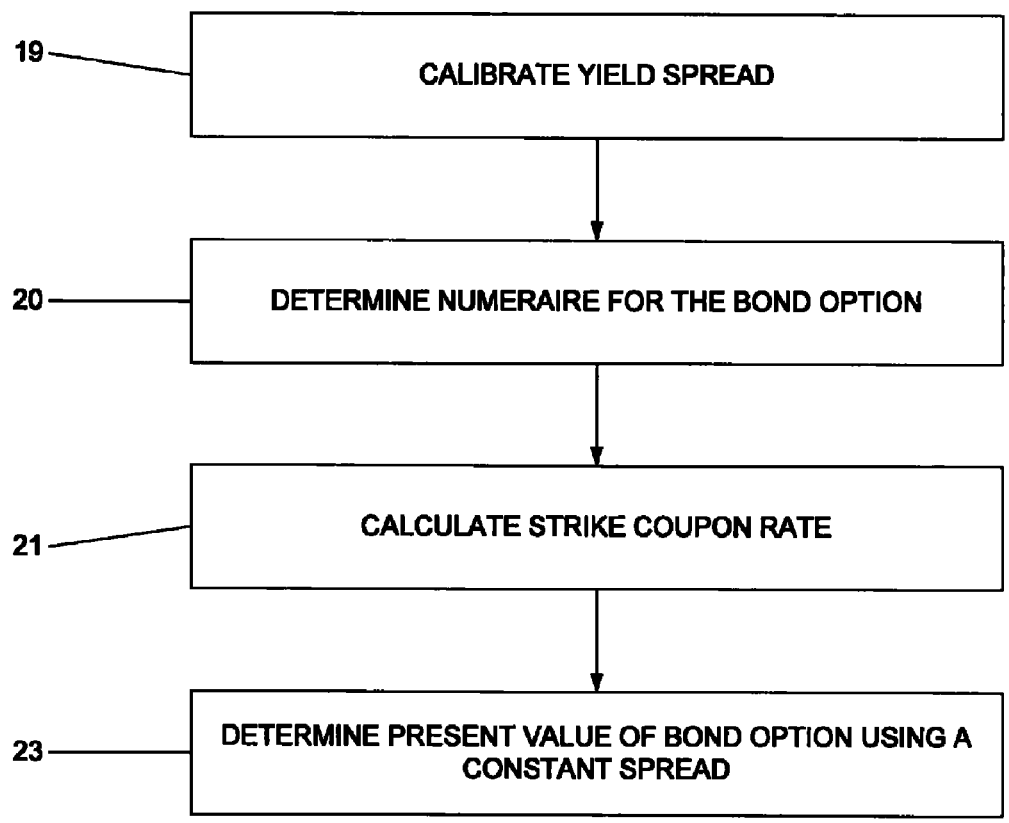
FIG. 2 is a flowchart illustrating steps taken to determine a present value of an option according to one embodiment of the present invention.

FIG. 2 illustrates a process performed by the processor 12, when executing the code of the module 18, to determine the present value of a bond option according to various embodiment of the present invention. For purposes of the discussion to follow, the bond underlying a bond option includes only coupons and principal due after the option exercise date. If an option exercises in the middle of a coupon period, the underlying bond may exclude the partial accrued interest up to the option exercise date. This assumption may be implied in summing up coupons due. As shown in FIG. 2, at step 19, a yield spread for the underlying bond may be calibrated. The yield spread may be calibrated based on the current (or spot) bond price (called "spot spread", which is used in calculating a numeraire) and the bond price at option settlement (called "forward spread", which is used in calculating a strike coupon rate), both of which may be known or estimated.

As shown in FIG. 2, at step 20, a numeraire for the bond option may be determined. The numeraire coupon annuity may be the present value of all bond coupons due after option expiry, scaled by 1/C, where C is the coupon rate on the bond. According to various embodiments, the numeraire may be denoted as:

$$CouponAnnuity = \sum_{i=1}^{N} \Delta_i \Lambda(t_0, t_i)$$

where i includes all coupons post expiry, $\Delta_i$ is the accrual period of the $i^{th}$ coupon, and $\Lambda(t_0, t_i)$ is the spot spread-adjusted discount factor for coupon date $t_i$ observed at $t_0$. Without regard to liquidity, this may be considered a tradable, self-financing portfolio that can be effectively obtained by longing (buying) the underlying coupon bond and shorting (selling) the principal and coupons due before option expiry, after scaling everything by the inverse of the constant coupon rate. For example, longing a bond/coupon means buying the bond/coupon, and shorting a bond/coupon means borrowing the bond/coupon and then selling the bond/coupon with the intention to buy the bond/coupon back in the future at a possibly lower price to repay the lender. For example, a long position on the underlying coupon bond may provide that if price increases a holder of the long position is entitled to a profit equal to the increase in value of underlying coupon bond when closing out the trade (e.g., selling the bond), and that if price falls the holder of the long position will lose an amount equal to the decrease in value of the underlying coupon bond when closing out the trade. Conversely, in a short position, a holder of the short position is entitled to a profit equal to the decrease in value of the principal and coupons when closing out the trade (e.g., buying back the principal and coupons) and will incur a loss if the value of the principal and coupons due increases when closing out the trade. One may be allowed to hold multiple long/short positions simultaneously to create an effective overall position, for example, longing the underlying coupon bond and shorting the principal and coupons due before option expiry may lead to an effective overall position of longing only the coupons due after option expiry, which after scaling may be the numeraire coupon annuity.

The spread-adjusted discount factors $\Lambda(t_0, t_i)$ may be defined as:

$$\Lambda(t_0, t_i) = e^{-\left(\int_{t_0}^{t_i} f(t_0, t) dt + \eta(t_0)(t_i - t_0)\right)}$$

where $f(t_0, t)$ is the instantaneous forward rate at t observed at $t_0$ and $\eta(t_0)$ is the time-varying spread that is constant over $t_i$. According to various embodiments, $\eta(t)$ may need to be calibrated. This calibration may occur more than once. For example, the calibration may occur once for the coupon annuity spot value and once for the strike coupon value on option expiry. $\eta(t)$ may be obtained by solving the following equation iteratively using a standard numeric root-finder method. For example, $$P(t) = L \cdot \left( C \sum_{i=1}^{N} \Delta_i \Lambda(t, t_i) + \Lambda(t, t_N) \right)$$

where P(t) is the spot or forward price of the underlying bond at time t, and L is the notional of the underlying bond.

At step 21, the strike coupon rate (or strike price) of the bond option, defined as $C_K$, may be calculated. The strike coupon $C_K$ may be defined as:

$$C_K = \frac{K/L - \Lambda(t_{exp}, t_N)}{\sum_{i=1}^{N} \Delta_i \Lambda(t_{exp}, t_i)}$$

where K is the option strike, and $t_{exp}$ is the option expiry date. This strike coupon rate is used in calculating the present value of the bond option as shown below.

At step 23, the present value of the bond option may be calculated using a unique probability measure such that the bond option value will be a Martingale measured by the numeraire. A Martingale is a zero-drift stochastic process which has the property that an expected value at any future time is equal to its value today. According to one embodiment, this may be expressed as:

$$\frac{BondOption}{CouponAnnuity} = \frac{P_{bo}(t_0)}{\sum_{i=1}^{N} \Delta_i \Lambda(t_0, t_i)} = \quad (1)$$

$$E\left[\frac{L \cdot \text{Max}\left[C \sum_{i=1}^{N} \Delta_i \Lambda(t_{exp}, t_i) + \Lambda(t_{exp}, T_N) - K/L, 0\right]}{\sum_{i=1}^{N} \Delta_i \Lambda(t_{exp}, t_i)}\right] =$$

$$L \cdot E\left[\text{Max}\left[C - \frac{K/L - \Lambda(t_{exp}, t_N)}{\sum_{i=1}^{N} \Delta_i \Lambda(t_{exp}, t_i)}, 0\right]\right] = L \cdot E[\text{Max}[C - C_k, 0]]$$

According to various embodiments, a virtual bond with a coupon rate $C_K$ may have the same cashflow schedule as the underlying bond and may evaluate to the strike on option expiry. As a result, an option exercise criterion may change from comparing spot bond price at expiry with strike to comparing bond coupon rate with strike coupon rate. The reason for comparing coupons instead of bond yields is that bond yield cannot be explicitly expressed in terms of cashflows or discount factors.

According to various embodiments, a second spread (denoted 4) between a forward swap rate and the strike coupon rate may be specified in order to apply swap market models (e.g., SABR, Constant Elasticity of Variance (or CEV) Random Vol, etc.) to bond options, because swap market models may be calibrated to swaption prices in the market and thus model forward swap rates only. Since bond options may be short-dated (e.g., maturing in less than six months), the second spread may be specified as either a constant or a constant portion of the forward swap rate.

According to various embodiments, Equation 1 may need to be cast into a form that swap market models may recognize. Since swap market models may be designed to model dynamics of forward swap rates $f_{tn}(t)$, where tn is the swap rate tenor, the strike coupon $C_K$ in Equation 1 may be related to $f_{tn}(t)$ through the second spread $\xi$. According to one embodiment, the second spread $\xi$ is assumed to be constant over the option life. That is:

$$f_{tn}(t) - C_K(t) = \text{constant} \quad (2)$$

where, swap rate tenor tn may be chosen to be the remaining life of the bond.

Under such an assumption, the present value of the bond option may be calculated using the constant value at step 23, as shown in FIG. 2. Under the assumption in Equation 2, Equation 1 may be recast as $$BondOption = \left(\sum_{i=1}^{N} \Delta_i \Lambda(t_0, t_i)\right) \cdot L \cdot E[\text{Max}[(C + f_{tn} - C_K) - f_{tn}, 0]] \quad (3)$$

$$= \left(\sum_{i=1}^{N} \Delta_i \Lambda(t_0, t_i)\right) \cdot L \cdot E[\text{Max}[K' - f_{tn}, 0]]$$

where K' is the artificial strike comprising of bond coupon rate C and the spread $f_{tn} - C_K$. Swap market models or any other suitable models may be applied to Equation 3 to evaluate the part inside expectation operator. The bond option present value may be obtained from the above calculations.

Figure 3:
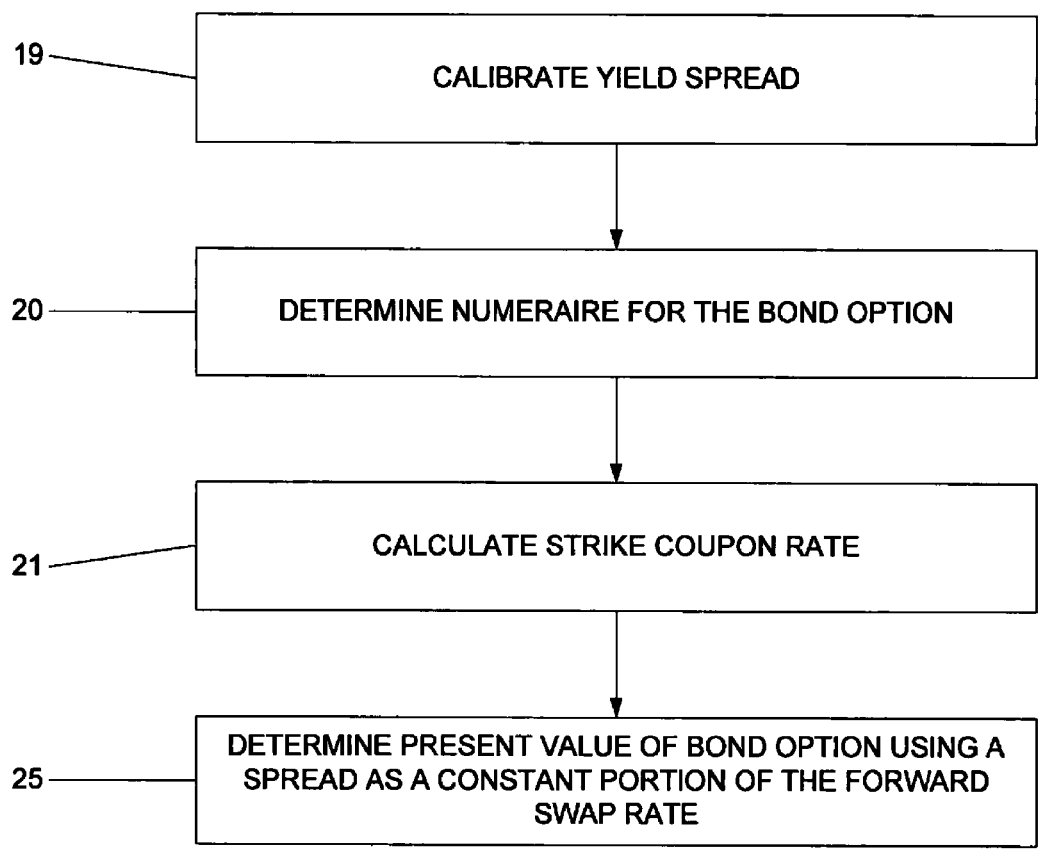

FIG. 3 is a diagram of the process according to another embodiment. FIG. 2 is similar to FIG. 3 except that instead of assuming the second spread $\xi$ is constant over the option life, it is assumed (at step 25) that the second spread $\xi$ is a constant portion over the option life. That is:

$$C_K(t)/f_{tn}(t) = \text{constant} \quad (4)$$

Under such an assumption, Equation 1 may be recast as $$BondOption = \left(\sum_{i=1}^{N} \Delta_i \Lambda(t_0, t_i)\right) L(C_K/f_{tn})_{t=t_0} \quad (5)$$

$$E[\text{Max}[C \cdot (f_{tn}/C_K)_{t=t_0} - C_k \cdot C \cdot (f_{tn}/C_K)_{t=t_0}, 0]]$$

$$= \left(\sum_{i=1}^{N} \Delta_i \Lambda(t_0, t_i)\right) L(C_K/f_{tn})_{t=t_0}$$

$$E[\text{Max}[C \cdot (f_{tn}/C_K)_{t=t_0} - f_{tn}, 0]]$$

-continued $$= \left(\sum_{i=1}^{N} \Delta_i \Lambda(t_0, t_i)\right) L(C_K/f_{tn})_{t=t_0} E[\text{Max}[K' - f_{tn}, 0]]$$

where K' is the artificial strike comprising of bond coupon rate C scaled by the constant $(f_{tn}/C_K)_{t=t_0}$. In various embodiments, swap market models or any other suitable model may be applied to Equation 5 to evaluate the part inside expectation operator. The bond option present value may be obtained from the above calculations at step 25.

In various embodiments, the system 10 may use both the process of FIG. 2 and the process of FIG. 3, as both processes may provide valuable information. However, intuitively and in numerical tests, Equation 5 (FIG. 3) may seem to be a more natural choice by allowing the spread between the forward swap rate and the strike coupon to vary over time. While K' defined in Equations 3 and 5 may differ little when $C_K$ is close to C, a time-varying spread may lead to an overall scaling factor $(C_K/f_{tn})_{t=t_0}$ in Equation 5, which may be non-trivial in most cases. Compared with other bond option pricing models (e.g., the yield diffusion bond option model), Equation 3 and Equation 5 may seem more logical by assuming strike coupon, rather than bond yield, fluctuating with forward swap rate, since bond yield may be by itself an accounting quantity, not directly associated with yield curve.

In various embodiments, the bond option pricing model may rely on assumptions on more than one spread. For example, a first assumption may be a time-varying, yet uniform spread between spot/forward rates implied by a bond and those from yield curves. A second assumption may be a constant or constant-portion spread between forward swap rate and strike coupon. The model may be extended to other government-bond-like products. Municipal bonds (e.g., bonds issued by state and local governments), and corporate bonds may be priced similarly by incorporating their default risks into their spreads to yield curve. In various embodiments, any product that may involve a strike on a sequence of fixed cashflows (e.g., fixed payments, not necessarily equal) may be converted by the bond option pricing model into a generic swaption and priced using swaption pricing models, though the numeraire may need to be adjusted in the case of non-equal fixed cashflows.

The results from the option pricing process may be stored in the database 16 (see FIG. 1) or some other memory or store associated with the system 10. Also the results from the option pricing process may be transmitted in one or more files to the client device 11 via the network 15.

Figure 4:
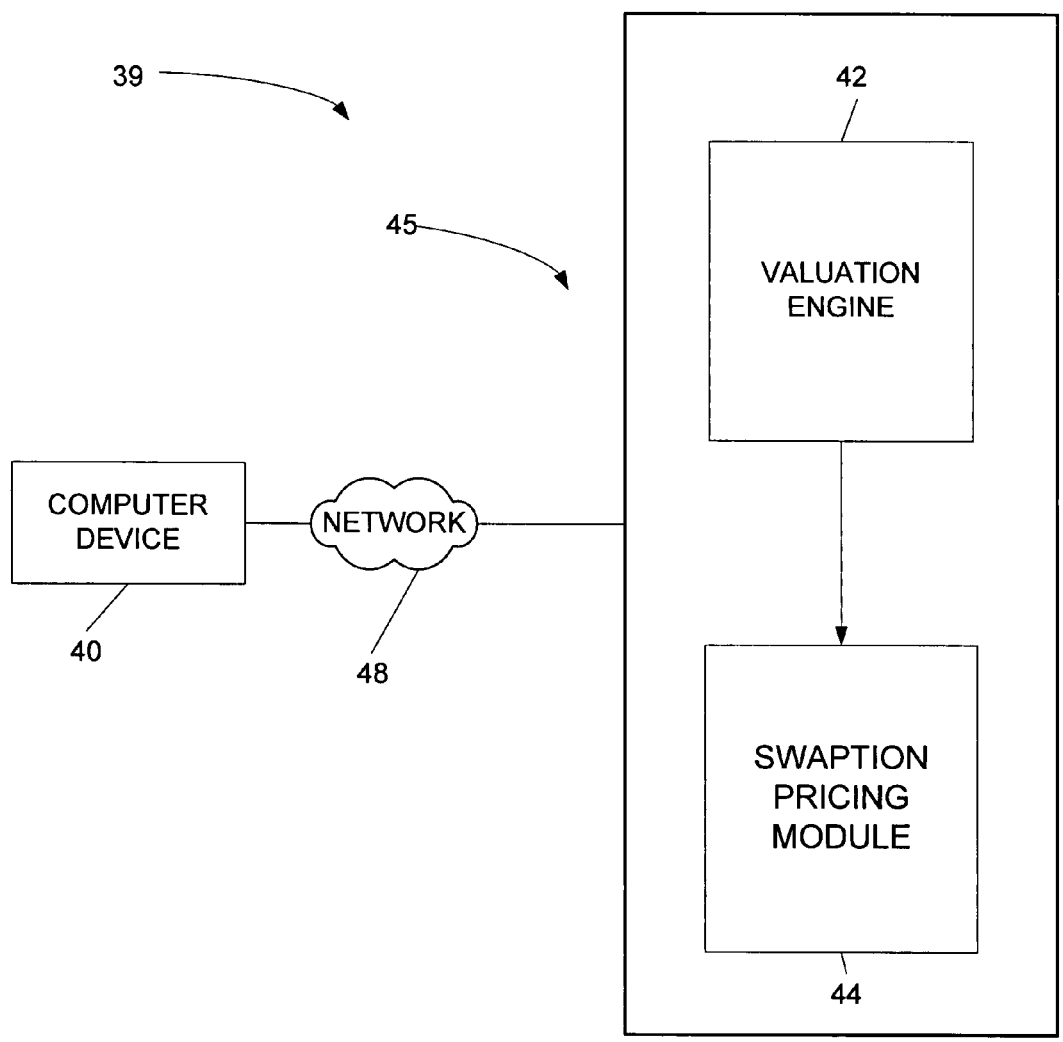
FIG. 4 depicts a valuation computer system according to one embodiment of the present invention.

FIG. 4 is a diagram of a system 39 according to other embodiments. In this embodiment, the system 39 includes a computer system 45 that includes a valuation engine 42 and a swaption pricing model 44. A bond trader or other end-user at a remote computer device 40 may transmit relevant information for pricing a bond option to the computer via a network 48. The network 48 may be, for example, a LAN, WAN, MAN, or any other suitable communication network. The computer system 45, using the valuation engine 42 and the swaption pricing module 44, may then compute the present value of the option, using the modules described above, and transmit the information back to the bond trader 40 (or other user) via the network. According to various embodiments, the bond trader may transmit the following information to the computer system 45 in order to have the present value of a bond option calculated: its notional; coupon rate; coupon accrual periods; payment dates; currency; option expiry date;

option settle date; exercise fees; accrued interests; option type (e.g., call or put); option position (e.g., long or short); strike price; bond spot price; and bond forward price on option settle date. Since the bond option may settle with the strike price plus accrued interest exchanging for the bond, the spot and forward prices may not exclude accrued interest up to the settlement date.

According to various embodiments, the valuation engine 42 may convert the input data for the bond option into various swaption-like pricing variables and then pass them to the swaption pricing module 44 as if a swaption were being priced. The conversion of bond option parameters to swaption-like parameters may involve the creation of the strike coupon and the calibration of the two yield spreads that price the bond to its spot and forward prices, as described above.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments.

It is to be understood that the figures and descriptions of the embodiments have been simplified to illustrate elements that are relevant for a clear understanding of the embodiments, while eliminating, for purposes of clarity, other elements. For example, certain operating system details for computer system are not described herein. Those of ordinary skill in the art will recognize, however, that these and other elements may be desirable in a typical processor or computer system. Because such elements are well known in the art and because they do not facilitate a better understanding of the embodiments, a discussion of such elements is not provided herein.

In general, it will be apparent to one of ordinary skill in the art that at least some of the embodiments described herein may be implemented in many different embodiments of software, firmware and/or hardware. The software and firmware code may be executed by a processor or any other similar computing device. The software code or specialized control hardware which may be used to implement embodiments is not limiting. For example, embodiments described herein may be implemented in computer software using any suitable computer software language type, such as, for example, C or C++ using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent and/or semitemporary. A computer-readable medium may further include one or more data signals transmitted on one or more carrier waves.

A "computer," "computer system," "host," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

While various embodiments have been described herein, it should be apparent that various modifications, alterations and adaptations to those embodiments may occur to persons skilled in the art with attainment of at least some of the advantages. For example, certain steps of the process flow of FIGS. 2 and 3 may be performed in different orders. The disclosed embodiments are therefore intended to include all such modifications, alterations and adaptations without departing from the scope of the embodiments as set forth herein.

What is claimed is:

1. A computer-implemented method for determining a present value of an option on a security having a fixed cash flow leg, the method comprising:
   computing, with a computer system that comprises a processor and memory, a numeraire for the option;
   computing, with the computer system, a strike coupon rate for the option based on a strike price of the option, a notional of the security, coupon dates of the security, and discount factors for the security; and computing, with the computer system, the present value of the option based on a product of factors, the factors comprising:
the numeraire;
the notional of the security; and
an expected value of the greater of a plurality of values, wherein the plurality of values comprises:
a first value that is a constant; and
a second value that is computed based on at least a coupon rate of the security and the strike coupon rate for the option, wherein the strike coupon rate is a Martingale.

2. A computer system comprising:
a processor; and
a memory in communication with the processor, wherein the memory stores instructions which when executed by the processor causes the processor to determine a present value of an option on a security having a fixed cash flow leg, by:
computing a numeraire for the option;
computing a strike coupon rate for the option based on a strike price of the option, a notional of the security, coupon dates for the security, and discount factors for the security; and
computing the present value of the option based on a product of factors, the factors comprising:
the numeraire;
the notional of the security; and
an expected value of the greater of a plurality of values, wherein the plurality of values comprises:
a first value that is a constant; and
a second value that is computed based on at least a coupon rate of the security and the strike coupon rate for the option, wherein the strike coupon rate is a Martingale.

3. A computer system comprising:
a processor; and
a database in communication with the processor, wherein the database stores financial data for the securities, and wherein the processor is programmed to determine a present value of an option on a security having a fixed cash flow leg, by:
computing a numeraire for the option;
computing a strike coupon rate for the option based on a strike price of the option, a notional of the security, coupon dates for the security, and discount factors for the security; and
computing the present value of the option based on a product of factors, the factors comprising:
the numeraire;
the notional of the security; and
an expected value of the greater of a plurality of values, wherein the plurality of values comprises:
a first value that is a constant; and
a second value that is computed based on at least a coupon rate of the security and the strike coupon rate for the option, wherein the strike coupon rate is a Martingale.

4. The method of claim 1, wherein a forward swap rate for a swap market is also used to compute the second value, wherein the forward swap rate is related to the strike coupon rate.

5. The method of claim 4, wherein the second value is computed based on the assumption that a difference between the forward swap rate and the strike coupon rate for the option is constant throughout the life of the option.

6. The method of claim 5, wherein the second value is computed as $(C+f_{tn}-C_k)-f_{tn}$, where C is the coupon rate of the security, $C_k$ is the strike coupon rate, and $f_{tn}$ is the forward swap rate, where to is a swap rate tenor.

7. The method of claim 4, wherein the second value is computed based on the assumption that a ratio of the strike coupon rate for the option to the forward swap rate is constant throughout the life of the option.

8. The method of claim 7, wherein the second value is computed as $C \cdot (f_{tn}/C_k)_{t=t_0}-f_{tn}$, where C is the coupon rate of the security, $C_k$ is the strike coupon rate, and $f_{tn}$ is the forward swap rate, where tn is a swap rate tenor.

9. The method of claim 4, wherein first value is zero.

10. The method of claim 1, wherein the security comprises a bond.

11. The method of claim 10, wherein the bond comprises a government bond.

12. The method of claim 10, wherein the bond comprises a municipal bond.

13. The method of claim 10, wherein the bond comprises a corporate bond.

14. The method of claim 1, wherein the strike coupon rate for the option is computed as $$C_K = \frac{K/L - \Lambda(t_{exp}, t_N)}{\sum_{i=1}^{N} \Delta_i \Lambda(t_{exp}, t_i)},$$

where $C_k$ is the strike coupon rate, K is a strike price of the option, L is the notional of the security, $\Delta_i$ is an accrual period for an ith coupon of the security, and $\Lambda$ represents the discount factors.

15. The computer system of claim 2, wherein a forward swap rate for a swap market is also used to compute the second value, wherein the forward swap rate is related to the strike coupon rate.

16. The computer system of claim 15, wherein the second value is computed based on the assumption that a difference between the forward swap rate and the strike coupon rate for the option is constant throughout the life of the option.

17. The computer system of claim 16, wherein the second value is computed as $(C+f_{tn}-C_k)-f_{tn}$, where C is the coupon rate of the security, $C_k$ is the strike coupon rate, and $f_{tn}$ is the forward swap rate, where tn is a swap rate tenor.

18. The computer system of claim 2, wherein the second value is computed based on the assumption that a ratio of the strike coupon rate for the option to the forward swap rate is constant throughout the life of the option.

19. The computer system of claim 18, wherein the second value is computed as $C \cdot (f_{tn}/C_k)_{t=t_0}-f_{tn}$, where C is the coupon rate of the security, $C_k$ is the strike coupon rate, and $f_{tn}$ is the forward swap rate, where tn is a swap rate tenor.

20. The computer system of claim 2, wherein first value is zero.

21. The computer system of claim 2, wherein the security comprises a bond.

22. The computer system of claim 21, wherein the bond comprises a government bond.

23. The computer system of claim 21, wherein the bond comprises a municipal bond.

24. The computer system of claim 21, wherein the bond comprises a corporate bond.

25. The computer system of claim 2, wherein the strike coupon rate for the option is computed as $$C_K = \frac{K/L - \Lambda(t_{exp}, t_N)}{\sum_{i=1}^{N} \Delta_i \Lambda(t_{exp}, t_i)},$$

where $C_k$ is the strike coupon rate, K is a strike price of the option, L is the notional of the security, $\Delta_i$ is an accrual period for an ith coupon of the security, and $\Lambda$ represents the discount factors.

26. The computer system of claim 3, wherein a forward swap rate for a swap market is also used to compute the second value, wherein the forward swap rate is related to the strike coupon rate.

27. The computer system of claim 26, wherein the second value is computed based on the assumption that a difference between the forward swap rate and the strike coupon rate for the option is constant throughout the life of the option.

28. The computer system of claim 27, wherein the second value is computed as $(C+f_{tn}-C_k)-f_{tn}$, where C is the coupon rate of the security, $C_k$ is the strike coupon rate, and $f_{tn}$ is the forward swap rate, where tn is a swap rate tenor.

29. The computer system of claim 3, wherein the second value is computed based on the assumption that a ratio of the strike coupon rate for the option to the forward swap rate is constant throughout the life of the option.

30. The computer system of claim 29, wherein the second value is computed as $C \cdot (f_{tn}/C_k)_{t=t_0} - f_{tn}$, where C is the coupon rate of the security, $C_k$ is the strike coupon rate, and $f_{tn}$ is the forward swap rate, where tn is a swap rate tenor.

31. The computer system of claim 3, wherein first value is zero.

32. The computer system of claim 3, wherein the security comprises a bond.

33. The computer system of claim 32, wherein the bond comprises a government bond.

34. The computer system of claim 32, wherein the bond comprises a municipal bond.

35. The computer system of claim 32, wherein the bond comprises a corporate bond.

36. The computer system of claim 3, wherein the strike coupon rate for the option is computed as $$C_K = \frac{K/L - \Lambda(t_{exp}, t_N)}{\sum_{i=1}^{N} \Delta_i \Lambda(t_{exp}, t_i)},$$

where $C_k$ is the strike coupon rate, K is a strike price of the option, L is the notional of the security, $\Delta_i$ is an accrual period for an ith coupon of the security, and $\Lambda$ represents the discount factors.

* * * * *

UNITED STATES PATENT AND TRADEMARK OFFICE
CERTIFICATE OF CORRECTION

PATENT NO. : 7,774,266 B1 Page 1 of 1
APPLICATION NO. : 11/983156
DATED : August 10, 2010
INVENTOR(S) : Jian Huang It is certified that error appears in the above-identified patent and that said Letters Patent is hereby corrected as shown below:

Column 10, line 4, delete "to" and substitute --tn--

Signed and Sealed this

Twenty-sixth Day of October, 2010

David J. Kappos
*Director of the United States Patent and Trademark Office*